(12) United States Patent
Karlsson et al.

(10) Patent No.: US 6,226,523 B1
(45) Date of Patent: *May 1, 2001

(54) INTERNET PROTOCOL TRAFFIC FILTER FOR A MOBILE RADIO NETWORK

(75) Inventors: Torgny Karlsson, Bromma; Anders Herlitz, Älta, both of (SE)

(73) Assignee: Telefonaktiebolaget LM Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/995,170

(22) Filed: Dec. 19, 1997

(51) Int. Cl.⁷ ............................... H04Q 7/20; H04B 7/00; G06F 15/173
(52) U.S. Cl. .................. 455/466; 455/433; 455/445; 455/560; 455/519; 709/225; 709/226; 320/338; 320/230; 320/420
(58) Field of Search .................. 455/433, 405, 455/406, 414, 445, 466, 560, 352, 461, 519; 370/338, 230, 420; 709/225, 226

(56) References Cited

U.S. PATENT DOCUMENTS

| | | | |
|---|---|---|---|
| 4,823,389 | * 4/1989 | Wurenberger | 380/23 |
| 5,068,916 | 11/1991 | Harrison et al. | |
| 5,159,592 | * 10/1992 | Perkins | 370/85.7 |
| 5,351,237 | * 9/1994 | Shinohara et al. | 370/58.3 |
| 5,570,366 | 10/1996 | Baker et al. | |
| 5,678,170 | * 10/1997 | Grube et al. | 455/2 |
| 5,793,762 | * 8/1998 | Penners et al. | 370/389 |
| 5,884,033 | * 3/1999 | Duvall et al. | 395/200.36 |
| 5,889,770 | * 3/1999 | Jokiaho et al. | 370/337 |
| 5,896,369 | * 4/1999 | Warsta et al. | 370/338 |
| 5,924,030 | * 7/1999 | Rautiola et al. | 455/426 |
| 5,983,270 | * 11/1999 | Abraham et al. | 709/224 |
| 6,021,327 | * 2/2000 | Nguyen et al. | 455/433 |

FOREIGN PATENT DOCUMENTS

| | | |
|---|---|---|
| 0 658 837 | 12/1994 | (EP) . |
| 0 812 085 | 12/1997 | (EP) . |

OTHER PUBLICATIONS

EPO Search Report, Sep. 10, 1998, File No. RS 100461 US.

Bellovin, et al., "Network Firewalls", IEEE Communications Magazine, Sep. 1994.

Sugiyama, et al., "Packet Routing Function on the PDC Mobile Packet Data Communication Network", IEEE International Conference on Communications, Jun. 23, 1996.

Yi–an Chen, "A Survey Paper on Mobile IP", from ftp://ftp.netlab.ohio–state.edu/pub/jain/courses/cis788–95/mobile_ip/index.html, Aug. 1995.*

* cited by examiner

Primary Examiner—William G. Trost
Assistant Examiner—Raymond B. Persino
(74) Attorney, Agent, or Firm—Jenkens & Gilchrist, P.C.

(57) ABSTRACT

An Internet Protocol traffic filter is provided for a mobile radio network. A database stores access privileges of the mobile station for accessing a remote host, and access privileges of the remote host for accessing the mobile station. A processor receives data from the mobile station addressed to a remote host. The processor accesses the database to determine whether the mobile station is allowed to access the remote host, and denies access if access is unauthorized. Otherwise, the processor sends the data to the remote host if access is authorized. The processor also receives data from a remote host, and determines whether the remote host is allowed to access the mobile station. The processor denies access to the mobile station if the remote host is unauthorized. Otherwise, the processor connects the remote host to the mobile station if access is authorized.

25 Claims, 3 Drawing Sheets

INTERNET PROTOCOL TRAFFIC FILTER FOR A MOBILE RADIO NETWORK

BACKGROUND OF THE INVENTION

1. Technical Field of the Invention

The present invention pertains in general to a method and apparatus for filtering data packets transmitted across a communication network and, more particularly, to a method and apparatus for filtering the transmission of data packets between a mobile station in a mobile radio network and an Internet Protocol (IP) type network.

2. Description of the Related Art

Packet data services are being introduced at an increasing rate into mobile radio networks. Packet data services provide an efficient connection between digital terminal equipment connected to mobile stations in a mobile radio network and remote hosts connected to the Internet. Using a packet data service, data is transmitted between the remote host and the digital terminal equipment as discrete data packets. The use of discrete data packets allows a mobile radio network operator to convey data from several mobile stations on a single channel and, further, to charge mobile station subscribers based on the quantity of data transmitted across the mobile radio network rather than on the duration of a connection between the mobile station and the remote host.

Using the packet data service, the mobile station subscriber connects digital terminal equipment, such as a personal computer, to the Internet or an Internet-like network such as an Intranet. This allows the mobile station subscriber to access remote hosts on the Internet and, in turn, allows remote hosts on the Internet to access the digital terminal equipment connected to the mobile station. For various reasons, mobile station subscribers and the mobile radio network operator may desire to control the flow of the IP traffic both to and from the mobile station. For example, since the mobile station subscriber is charged for data packets sent to the mobile station subscriber by a remote host, the mobile station subscriber may wish to filter IP traffic directed to the digital terminal equipment to certain authorized remote hosts.

In a similar fashion, the mobile radio network operator may wish to individually filter the ability of each mobile station to access remote hosts. For example, the mobile radio network operator may wish to create a virtual network, wherein a select group of mobile station subscribers and remote hosts have access to the virtual network. By establishing such virtual networks, the mobile radio network operator can charge different tariffs to each mobile station subscriber based on the subscriber's membership in one or more of the virtual networks.

Several techniques currently exist for controlling the transmission of data between computing devices over a network. These techniques apply both to hosts on the same network as well as to hosts located on different networks. For example, firewalls are commonly used as barriers between an internal network and external hosts to prevent the internal network from unauthorized access by the external hosts or others. The firewall also prevents the transmission of data from the external host to hosts on the internal network.

Other techniques for filtering traffic on a communication network involve filtering the communication of data to certain segments of a single or multiple communication networks. Such techniques are based on the address of the destination host and apply indiscriminately to all hosts. These filtering techniques are designed to increase the bandwidth of the communication network by filtering communication of the data to only those segments of the communication network necessary for the data to reach the destination host from the originating host.

It would be advantageous to devise a method and apparatus to individually filter IP traffic for each mobile station in a mobile radio network so as to filter communication between digital terminal equipment connected to a mobile station on a mobile radio network and remote hosts located on an Internet. It would also be advantageous if such a method and apparatus allowed both the mobile station subscriber and the mobile radio network operator to independently establish access privileges to and from the digital terminal equipment.

SUMMARY OF THE INVENTION

The present invention comprises an IP traffic filter for a mobile radio network. A database stores access privileges for the mobile station to access a remote host, and access privileges for the remote host to access the mobile station. A processor receives data from the mobile station addressed to a remote host. The processor accesses a local copy of the database to determine whether the mobile station is allowed to access the remote host, and denies access if access to the remote host by the mobile station is unauthorized. Otherwise, the processor allows access to a remote host if access to the remote host is authorized.

The processor also receives data from a remote host addressed to the mobile station, and determines whether the remote host is allowed to access the mobile station. The processor denies access to the mobile station if the remote host is unauthorized. Otherwise, the processor allows the remote host to access the mobile station if access to the mobile station by the remote host is authorized.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
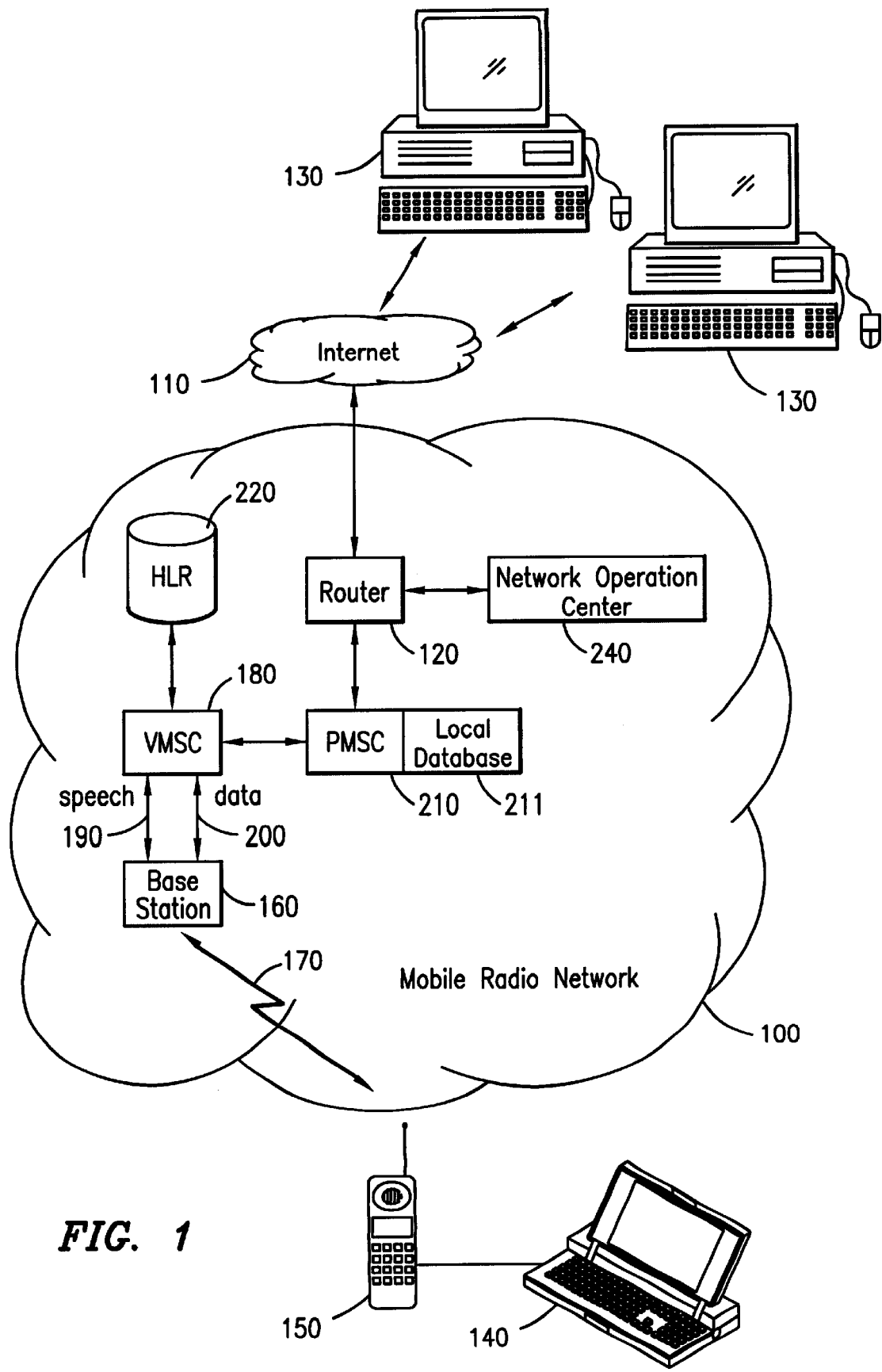
FIG. 1 is a functional block diagram of an IP traffic filter for a mobile radio network consistent with a preferred embodiment of the present invention.

Referring now to FIG. 1, there is illustrated a functional block diagram of an IP traffic filter consistent with a preferred embodiment of the present invention. A mobile radio network 100 communicates with an Internet 110 via a router 120. The mobile radio network 100 can be any type of mobile radio network, such as, for example, a cellular telephone network, and can be implemented using any appropriate architecture or air interface standard. For illustrative purposes, the mobile radio network 100 is described as implementing a Personal Digital Cellular (PDC) protocol. Likewise, the Internet 110 can be any type of network following IP standards. The Internet 110 is connected to one or more remote hosts 130. Digital terminal equipment 140, such as a personal computer, communicates with the remote host 130 via a mobile station 150, and the mobile station 150 communicates with a base station 160 of the mobile radio network 100 via an air interface 170.

For voice communication, the base station 160 communicates with the mobile radio network 100 through a Visited Mobile services Switching Center (VMSC) 180 via a speech communication link 190. For data communications, the base station 160 communicates with a Packet Mobile services Switching Center (PMSC) 210 through the VMSC 180 via a packet data service link 200. The PMSC 210 is responsible for handling data packets communicated to and from the digital terminal equipment 140.

The PMSC 210 communicates with the Internet 110 via the router 120. Information regarding the access privileges of the mobile station 150 and the remote host 130 are stored in a database located in a Home Location Register (HLR) 220. The PMSC 210 maintains a local copy 211 of access privileges contained in the HLR 220 for all mobile stations 150 which have registered their presence in the mobile radio network 100. The data contained in the databases can be entered or modified by the mobile radio operator via the operation center 240. The data contained in the databases can also be entered or modified by the mobile station subscriber. As an example, the user interface for the subscriber can be a web server accessible from the Internet 110 and provides a service for entering and modifying filter parameters. Operation of the base station 160, the VMSC 180 and the HLR 220 to effectuate voice communication between the mobile station 150 and the mobile radio network 100, is performed by conventional methods. Likewise, data packet communication between digital terminal equipment 140 and remote hosts 130 is performed by conventional methods.

The databases located in the HLR 220 and the local copy 211 store information associated with the mobile station 150 identifying which remote hosts 130 the mobile station 150 is allowed to access. The databases also contain information identifying which remote hosts 130 are allowed to access the mobile station 150. The data contained in the databases can be entered or modified by the mobile radio operator via the operation center 240. The data contained in the databases can also be entered or modified by the mobile station subscriber. As an example, the user interface for the subscriber can be a web server accessible from the Internet 110 and provides a service for entering and modifying filter parameters.

Figure 2:
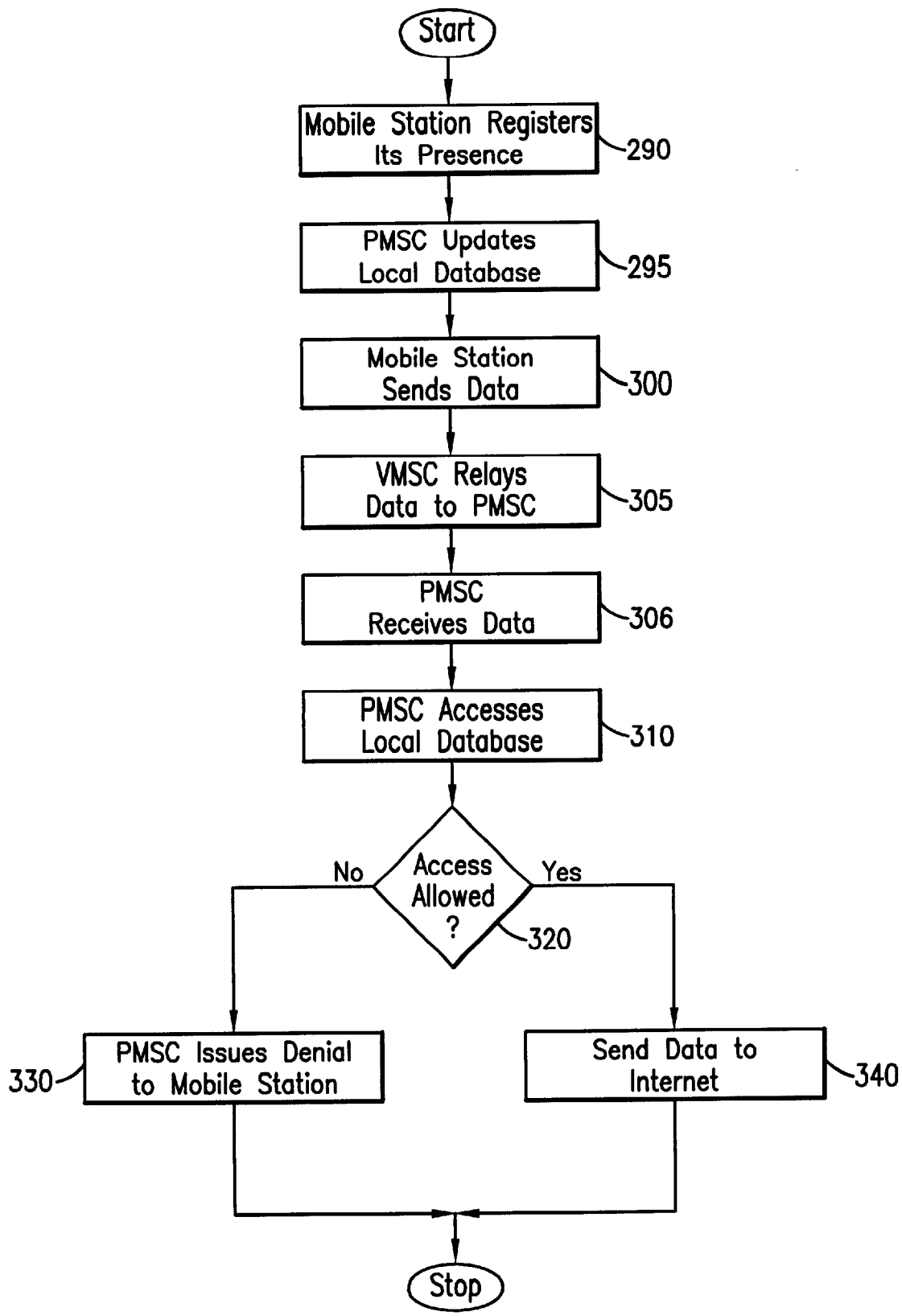
FIG. 2 is a flow diagram of a method for filtering access to a remote host by a mobile station consistent with the preferred embodiment of the present invention.

Referring now to FIG. 2, there is illustrated a method for filtering IP traffic. When a mobile station 150 initiates operation in the mobile radio network 100, thus mobile station 150 registers its presence with the mobile radio network 100 (step 290) and in response the PMSC 210 updates the local database 211 (step 295). The computing device 140 sends data to a remote host 130(step 300) and the data is relayed through the VMSC 180 to the PMSC 210 (step 305). The PMSC 210 receives the identity of the mobile station 150 included with the data which, in this exemplary embodiment, is a mobile station International Mobile Station Identity (IMSI) number associated with the mobile station 150. The PMSC 210 also receives an IP address associated with the mobile station 150 and the digital terminal equipment 140, as well as the IP address of the remote host 130 (step 306). The PMSC 210 accesses the local database 211 to determine the access privileges of the mobile station 150 to access the remote host 130 (step 310).

The database in the HLR 220 and the local database 211 contain a list of allowed remote hosts 130 associated with the mobile station 150 or, in an alternative, the databases contain a list of disallowed remote hosts 130 associated with the mobile station 150. In any event, the PMSC 210 receives the information and determines whether the mobile station 150 is authorized to access the remote host 130 based on the information contained in the local database 211(step 320). In another embodiment of the present invention, the database in the HLR 220 and the local database 211, group the mobile station 150 and the remote hosts 130 into one or more virtual networks. Access to the remote host 130 from the mobile station 150, as well as access from the remote host 130 to the mobile station 150, is based on membership in a particular virtual network.

After determining the access rights of the mobile station 150 in step 320, the PMSC 210 either allows, or denies access based on the determination. If the PMSC 210 has determined that access is not allowed, the PMSC 210 issues a denial message to the mobile station 150 (step 330). Otherwise, if the PMSC 210 determines that access is allowed, the PMSC 210 continues sending the data to the Internet 110 (step 340). The PMSC 210 sends data to the Internet 110 via the router 120 in a conventional manner.

Figure 3:
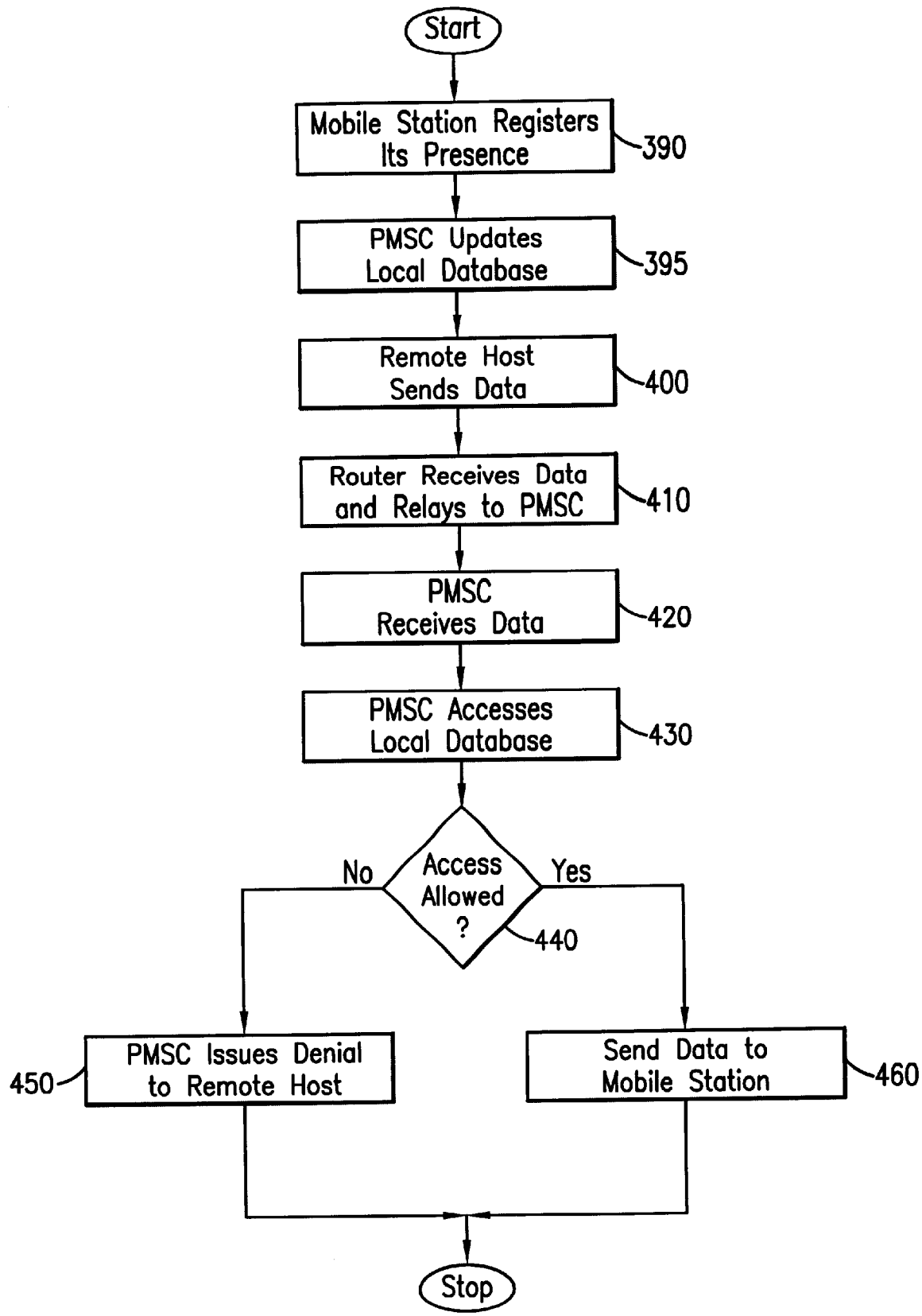
FIG. 3 is a flow diagram of a method for filtering access to digital terminal equipment connected to a mobile station by a remote host consistent with the preferred embodiment of the present invention.

Referring now to FIG. 3, there is illustrated a flow diagram of a method for filtering requests to digital terminal equipment connected to a mobile station by a remote host consistent with the preferred embodiment of the present invention. When a mobile station 150 initiates operation in the mobile radio network 100, the mobile station 150 registers its presence with the mobile radio network 100 (step 390) and in response the PMSC 210 updates the local database 211 (step 395). The remote host 130 sends a data packet to the PMSC 210(step 400) via the Internet 110 and the router 120. The router 120 receives the data and relays the data to the PMSC 210 (step 410). The PMSC 210 receives the data (step 420) and accesses the local database 211 (step 430). The PMSC 210 uses the information contained in the database to determine whether access by the remote host 130 to the digital terminal equipment 140 connected to the mobile station 150 is allowed (step 440). If access is not allowed, the PMSC 210 issues a denial to the remote host 130 (step 450). Otherwise, the PMSC 210 sends the data to the digital terminal equipment 140 connected to the mobile station 150 via the mobile radio network 100 (step 460).

Storing the data pertaining to access privileges in the HLR 220 enables the use of current roaming functions which are well known in the industry. This allows subscribers to roam between different mobile radio networks and with the access privileges data remaining valid Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. An IP traffic filter for a mobile radio network that provides both voice and data services for one or more mobile stations when present in said mobile radio network, comprising:

a database for storing access privileges of said mobile stations for accessing one or more remote hosts, and access privileges of said remote hosts for accessing said mobile stations, said database including a plurality of entries respectively associated with mobile stations present in the network, each said entry indicative of an access privilege associated with the corresponding mobile station, said database including a plurality of data storage locations coupled to one another and distributed across the network to permit each said entry to travel through the network with the corresponding mobile station; and a processor for routing data to and from said mobile stations from and to said remote hosts, the processor further for accessing said database to determine access privileges, and for denying or allowing access in response to a determined access privilege and wherein said database can be altered both from said mobile stations and from said remote hosts.

2. The IP traffic filter recited in claim 1, wherein said processor comprises a PMSC in said mobile radio network.

3. The IP filter of claim 1, further comprising a HLR for maintaining said database.

4. The Ip traffic filter recited in claim 3, wherein said processor comprises one of a plurality of PMSCs in said mobile radio network, each of said PMSCs coupled to a respective portion of said database, and wherein, for eack of said mobil stations registered with said one PMSC, said one PMSC stores in its associated database portion a copy of the corresponding access privileges maintained in said HLR.

5. The IP filter recited in claim 1, further comprising a router for connecting said mobile radio network to an Internet.

6. The IP filter recited in claim 1, further comprising a means for entering and modifying entries in said database.

7. The IP filter recited in claim 6, wherein said means for entering and modifying comprises an Internet web server.

8. The IP traffic filter recited in claim 6, wherein said means for modifying said entries includes one of said remote hosts.

9. The IP traffic filter recited in claim 1, wherein said one or more mobile stations and said one or more remote hosts are organized into one or more virtual networks in accordance with said access privileges.

10. A method for filtering IP traffic originating from one or more mobile stations when present in a mobile radio network, wherein said mobile network handles both voice and data, comprising the steps of:

maintaining a database comprising access rights of said mobile stations for accessing one or more remote hosts, said database including a plurality of entries respectively associated with mobile stations present in the network, each said entry indicative of an access right associated with the corresponding mobile station;

the database entries traveling through the network and residing in a plurality of locations in the database as their associated mobile stations travel through the network;

receiving data sent from one of said mobile stations to one of said remote hosts;

using the database to determine access rights of said one mobile station to access said one remote host;

denying access to said one remote host if said access is unauthorized;

forwarding said data to said one remote host if said access is authorized; and providing a means by which said database can be altered both from said mobile stations and from said remote hosts.

11. The method of claim 10, wherein the step of receiving data addressed to said remote host comprises the steps of:

receiving an identity of said one mobile station;

receiving an IP address of said one remote host; and receiving an IP address associated with said one mobile station.

12. The method of claim 11, wherein the step of receiving said identity of said one mobile station comprises receiving an IMSI number associated with said one mobile station.

13. The method of claim 11, wherein said using step comprises comparing the IP address of said one remote host against a list of allowed destination hosts provided in one of said database entries associated with said one mobile station.

14. The method of claim 11, wherein said using step comprises comparing said IP address of said one remote host against a list of disallowed destination hosts provided in one of said database entries associated with said one mobile station.

15. The method of claim 11, wherein said using step comprises comparing said identity of said one mobile station against a group of said database entries indicative of mobile station membership in a virtual network.

16. The method of claim 10, wherein said maintaining step comprises creating as part of said database a local copy of said access rights associated with each of said mobile stations present in said mobile radio network.

17. The method of claim 16, wherein said using step includes using said local copy of said access rights.

18. A method for filtering IP traffic directed to one or more mobile stations when present in a mobile radio network capable of transmitting both voice and data from one or more remote hosts, comprising the steps of:

maintaining a database comprising access rights of said remote hosts for accessing said mobile stations, said database including a plurality of entries respectively associated with mobile stations present in the network, each said entry indicative of an access right of a remote host to access the corresponding mobile station;

the database entries traveling through the network and residing in a plurality of locations in the database as their associated mobile stations travel through the network;

receiving from one of said remote hosts data addressed to one of said mobile stations;

using the database to determine access rights of said one remote host to access said one mobile station;

denying access to said one mobile station if access to said one mobile station by said one remote host is unauthorized; otherwise sending the data from said one remote host to said one mobile station if said access to said one mobile station by said one remote host is authorized; and providing a means by which said database can be altered both from said mobile stations and from said remote hosts.

19. The method of claim 18, wherein said using step comprises comparing an IP address of said one remote host against a list of allowed originating remote hosts provided in one of said database entries associated with said one mobile station.

20. The method of claim 18, wherein said using step comprises comparing an IP address of said one remote host against a list of disallowed originating remote hosts provided in one of said database entries associated with said one mobile station.

21. The method of claim 18, wherein said using step comprises comparing an identity of said one mobile station against a group of said database entries indicative of mobile station membership in a virtual network.

22. The method of claim 18, wherein the step of denying access to said one mobile station comprises transmitting a denial message to said remote host.

23. The method of claim 18, wherein said using step further comprises converting an IP address of said one mobile station to an associated mobile station ISDN number.

24. The method of claim 18, wherein said maintaining step comprises creating as part of said database a local copy of said access rights associated with each of said mobile stations present in said mobile radio network.

25. The method of claim 24, wherein said using step includes using said local copy of said access rights.

* * * * *

UNITED STATES PATENT AND TRADEMARK OFFICE
CERTIFICATE OF CORRECTION

PATENT NO. : 6,226,523 B1
DATED : May 1, 2001
INVENTOR(S) : Torgny Karlsson et al.

It is certified that error appears in the above-identified patent and that said Letters Patent is hereby corrected as shown below:

<u>Title page,</u>
Item [75], Inventors, delete "Anders Herliz, Älta" replace with -- Anders Herlitz, Nacka --

<u>Column 3,</u>
Line 52, delete "thus" replace with -- the --

Signed and Sealed this

First Day of October, 2002

*Attest:*

JAMES E. ROGAN
*Attesting Officer*  *Director of the United States Patent and Trademark Office*